(12) United States Patent
Hagny

(10) Patent No.: US 7,856,934 B2
(45) Date of Patent: Dec. 28, 2010

(54) SEED TUBE AND BOOT FOR OPENER ASSEMBLY OF AGRICULTURAL SEEDER

(76) Inventor: Matthew P. Hagny, 4951 Ashton St., Bel Aire, KS (US) 67220-1445

(*) Notice: Subject to any disclaimer, the term of this patent is extended or adjusted under 35 U.S.C. 154(b) by 0 days.

(21) Appl. No.: 12/402,972

(22) Filed: Mar. 12, 2009

(65) Prior Publication Data
US 2010/0229770 A1 Sep. 16, 2010

(51) Int. Cl.
  A01C 5/00 (2006.01)
  A01C 7/00 (2006.01)
  A01C 9/00 (2006.01)
  A01C 13/00 (2006.01)
(52) U.S. Cl. .................. 111/163; 111/170; 111/189
(58) Field of Classification Search ......... 111/163–165, 111/170, 189
See application file for complete search history.

(56) References Cited

U.S. PATENT DOCUMENTS

| 713,616 | A | 11/1902 | Dobbin |
|---|---|---|---|
| 1,056,386 | A | 3/1913 | Wheeler |
| 2,869,489 | A | 1/1959 | Buhr |
| 2,917,012 | A | 12/1959 | Oehler et al. |
| 2,920,587 | A | 1/1960 | Shriver |
| 3,213,812 | A | 10/1965 | Forsyth et al. |
| 4,031,834 | A | 6/1977 | Klenke |
| 4,196,679 | A | 4/1980 | Moore |
| 4,760,806 | A | 8/1988 | Bigbee et al. |
| 4,796,550 | A | 1/1989 | Van Natta et al. |
| 5,092,255 | A | 3/1992 | Long et al. |
| 5,595,130 | A | 1/1997 | Baugher et al. |
| 5,752,454 | A | 5/1998 | Barton |
| 5,802,995 | A | 9/1998 | Baugher et al. |
| 6,029,591 | A | 2/2000 | Baugher et al. |
| 6,216,616 | B1 | 4/2001 | Bourgault |
| 6,237,696 | B1 | 5/2001 | Mayerle |
| 6,347,594 | B1 | 2/2002 | Wendling et al. |
| 6,386,127 | B1 | 5/2002 | Prairie et al. |
| 7,168,376 | B2 | 1/2007 | Johnston |
| 7,357,193 | B2 | 4/2008 | Harmon et al. |
| 2002/0056407 | A1 | 5/2002 | Milne |

Primary Examiner—Christopher J. Novosad
(74) Attorney, Agent, or Firm—Jeffrey L. Thompson; Thompson & Thompson, P.A.

(57) ABSTRACT

An opener assembly for an agricultural seeder has an opener disc attached to an opener subframe for rotation about an axis. The opener disc is angled to the direction of travel to create a furrow for depositing seeds. A boot is mounted to the opener subframe beside the opener disc for preventing loose soil from falling into the furrow ahead of seed deposited therein. The boot contacts and scrapes the opener disc and creates an enclosure between the boot and the opener disc. A flexible seed bounce flap provides the rear wall of the enclosure. The boot has a lower edge that fits entirely within the furrow created by the opener disc. A seed tube having a lower end extending into the enclosure is mounted to the opener subframe by a bracket independently of the boot. A structure is also provided for limiting downward movement of a firming wheel arm.

23 Claims, 8 Drawing Sheets

SEED TUBE AND BOOT FOR OPENER ASSEMBLY OF AGRICULTURAL SEEDER

BACKGROUND OF THE INVENTION

1. Field of the Invention

The present invention relates generally to agricultural seeders that produce open furrows in the soil into which seeds are placed, and more particularly, to an improved seed-directing tube and boot, and method of attaching and operating the tube and boot for use with such seeders in obtaining improved seed placement in the furrows.

2. Description of the Related Art

Agricultural planting methods continue to advance in response to widespread adoption of "no-till" or "reduced-till" crop production techniques with greatly reduced dependence on tillage of the soil, and in which the next crop's seeds are often placed directly into the previous crop's stubble or crop residues. No-till or reduced-till seeding differs greatly from seeding into a tilled seedbed. Although the soil conditions for no-till seeding are typically characterized by more structural stability than tilled soils, as the soil particles are "aggregated" or held together by old roots, fungi, and other organic substances and molecular attractions binding the particles together, it is still of considerable importance to prevent loose soil and "duff" (chaff and small pieces of partially decomposed mulch) from entering the seed furrow prematurely, before the seeds have come to rest at the bottom of the furrow. This is of particular importance on single-disc opener designs which are particularly vulnerable to loose soil and duff sloughing into the furrow after the opener disc has passed, relying on soil stability and/or a seed boot to inhibit the loose soil and duff from entering the furrow until after the seeds have been adequately placed in the bottom of the cut furrow.

Single-disc opener designs for seed or fertilizer placement have met with considerable success in no-till seeding, partly due to simplicity. Because of the structural stability of no-till soils, much higher down-force requirements are imposed on the opener disc to cut the furrow to a consistent depth. This additional strain generally necessitates more robust opener discs together with a much larger hub and mechanical bearing(s) on which the opener discs are rotatably mounted, and this durability requirement also lends an advantage to the single-disc design for cost and space constraints. Larger hubs and bearings on the opener discs can interfere with the routing of seed-delivery tubes and positioning of gauge wheels.

Gauge wheels pose a design problem because the most desirable positioning is with the gauge wheel contacting the soil most forcefully at the point where the opener disc's rearward edge is rotating up out of the soil. This allows the gauge wheel to control "sidewall blowout," which results from the opener disc's upward rotation and angle to the direction of travel causing the furrow sidewall to tear apart and lift upward, i.e., following the disc's rotation upward as it exits the furrow. When left unchecked, sidewall blowout sometimes results in the furrow sidewall tearing completely free and being flung out of the furrow by the opener disc's momentum, thereby creating an irregularly shaped furrow and/or allowing pieces of the sidewall to enter the furrow before seeds have been properly placed.

The opener disc is typically mounted at a slight angle to the direction of travel so that it is pushing soil laterally to create a furrow. For controlling sidewall blowout, gauge wheels generally are mounted in the same plane as the opener discs, with the inner lip of the gauge wheel flush against the outer edge of the opener disc ("outer" refers to the side away from the furrow being cut). With a 16-inch or 18-inch diameter opener disc (the preferred disc sizes due to optimal cutting ability at 1.5- to 2-inch seeding depth; larger sizes hairpin more mulch, and smaller sizes are more prone to plugging or "bulldozing" of clumps of straw or debris), and a 15-inch gauge wheel (again, the preferred size, since smaller sizes resist rolling over small obstacles in the field, and larger sizes get in the way of other components), the forward edge of the gauge wheel is then approximately at the axis of the opener disc, which prevents the opener disc's hub from being located on the outside of the opener disc, especially if it is a large heavy-duty hub ("outside" refers to the side away from the furrow being formed). Hence, a double-disc design has somewhat limited options as to where to locate relatively large hubs, since the opener discs must be at a narrow angle to each other to cut the soil properly, with such relationship physically precluding large hubs from being between the discs. On the single-disc design, the large hubs are typically located on the opposite side of the opener disc from the gauge wheel, which is the inside of the opener disc.

With a large hub on the inside of the opener disc, the seed delivery tube must pass either ahead of the hub or behind it. If the seed tube passes in front of the hub, the trajectory of the seeds passing inside the tube will be approximately at a 45-degree angle to the furrow (in the horizontal plane of the soil when on level terrain), aimed rearward as much as downward, due to the need for the seeds to enter the furrow when it has appreciable width, which would be directly below the hub and rearward of it. The rearward seed trajectory poses a significant problem of ricochet, which is the tendency of the seeds to bounce upward and out of the furrow after striking the soil or the opener disc after the seeds exit the seed-directing tube and/or boot. While a significant problem for grain drills with gravity-fed seed delivery, this problem is greatly exacerbated by forced-air delivery which has become commonplace on larger width drills called "air drills." The seeds are carried in an air stream and move at a velocity greater than that attained by seeds falling solely under the influence of gravity, thereby increasing the ricochet effect. Further, if no provision is made for the pressure of the air stream to be vented or diffused to the ambient atmosphere until the seeds exit the lower end of the seed tube or boot, the air stream itself can carry lighter seeds out of the furrow as the air stream blasts into the furrow and then out of the furrow as it escapes.

A single-disc no-till drill opener design that has met with great success in the marketplace is typified by the John Deere drill models 1590 and 1890, and their predecessor models 1560 and 1860 (hereinafter "Deere 60- and 90-series"), both of which are slightly updated versions of the basic opener design described in U.S. Pat. No. 4,760,806 issued to Bigbee, which was first embodied in John Deere drill models 750 and 1850 (hereinafter "Deere 50-series"). On the Deere 60- and 90-series openers, as well as the 50-series, the seed boot is held directly on the opener subframe via a single bolt, with the boot being able to pivot on the bolt's axis by a few degrees. The boot is urged toward the opener disc by a leaf spring secured in a recess below the bolt, which continually holds one side of the boot's forward/lower edge flush against the opener disc. The seed tube passes forward of the disc's hub and enters the top of the boot near the aforementioned bolt attachment point which is also ahead of the hub.

A significant downfall of the design of the John Deere 50-, 60- and 90-series drill opener assemblies is the protrusion of the boot beyond the cut made by the opener disc (not operating in the "shadow" of the opener disc). This protrusion greatly inhibits the ability of the boot to be operated deeper than with the boot's lowermost edge approximately flush with the soil surface, due to the boot being relatively blunt on its lower edge and therefore resisting penetration of firm soil. Attempts to operate the boot more deeply in relation to the soil result in higher horsepower requirements, much higher down-force requirement on the opener unit (or a tendency for the opener to "ride out" and fail to maintain depth), and substantially greater wear on the boot and its attachment point. With the boot not extending below the soil surface, the boot has very limited ability to hold loose soil and duff out of the furrow while the seeds are being placed, as well as very limited ability to compensate for the ricochet effect of seed bounce. This seed bounce problem is exacerbated by the failure of the boot to extend below the soil surface, and by the remarkable failure of the seed bounce flap to enclose the rear of the boot, being situated at a 45-degree angle from vertical and in relation to the boot such that a sizeable gap occurs at the rear corner during field operation. The flap is the essence of U.S. Pat. No. 5,092,255 issued to Long et al., termed a "seed boot extension" therein, although commonly called a seed bounce flap in the industry.

Other single-disc drill designs have routed the seed tube behind the opener disc's hub, resulting in the seed tube being more nearly vertical, and possibly angled slightly forward at the lower end. The more vertical orientation results in less seed ricochet, although it is quite important that the tube not be too far rearward in relation to the opener disc because of reduced control over seed placement, and it is also important that a boot and seed bounce flap adequately direct the seeds into the bottom of the furrow. This seed tube arrangement was integrated into a single-disc no-till opener that was marketed for several years (now discontinued) as Flexi-coil's "FSO" or "F/SO," and is depicted in U.S. Pat. No. 6,237,696 B1 issued to Mayerle. With Mayerle '696, the seed boot (a.k.a. "scraper") is attached directly to the seed tube, which is itself rigidly attached to the opener subframe. The boot attaches to the tube via two bolts and by compressing a thin rubberized pad between the upper end of the boot and the tube. As the boot (scraper) wears against the opener disc, the bolts must be continually readjusted to keep the forward edge of the boot against the opener disc; neglect of this adjustment often results in weeds or straw becoming lodged between the boot and the opener disc, which eventually arrests the rotation of the opener disc or causes the opener to otherwise plug with straw or debris. However, the shape and location of the Mayerle '696 boot and tube allow much greater precision in placing seeds at the bottom of the seed furrow as compared to the Deere 60- and 90-series.

U.S. Pat. No. 6,216,616 B1 issued to Bourgault depicts a single-disc opener (lacking a gauge wheel; depth is limited only by down-force applied to the disc opener and by soil resilience which varies across the field) with a scraper or boot attached directly to the opener subframe, independent of the seed tube, and with the scraper or boot being rotatably mounted and spring-tensioned against the opener disc. The design has the seed tube routed rearward of the opener disc's hub. The general design of the Bourgault '616 seed tube and scraper/boot arrangement overcomes some of the adjustment and straw plugging difficulties mentioned in the foregoing discussion of the Flexi-coil FSO (Mayerle '696). However, the Bourgault scraper/boot design is almost entirely ineffective at holding loose soil and duff out of the furrow because of the failure of the scraper/boot to extend forward into the area where the disc is actually creating the cut, failure to extend sufficiently downward into the furrow, and failure to create any sort of enclosure at the rear of the tube or scraper. Furthermore, the Bourgault design (embodied in air drills sold by Bourgault Industries Ltd.) lacks the seed-placement precision of gauge-wheel openers such as the Deere 60- and 90-series, and also lacks separation of the seed-firming function from furrow closing (and from opener depth-gauging), all of which are agronomically desirable.

Baugher et al., U.S. Pat. Nos. 5,595,130, 5,802,995, and 6,029,591, depict a single-disc opener with a tube passing rearward of the opener disc's hub, although with the boot ("runner") attached directly to the tube. The entire boot and tube assembly pivots about a single attaching bolt or pin at the forward end of the assembly, and is biased toward the opener disc with a spring. In '995 and '130, the boot pivots about an axis that is mostly horizontal (with its axis along the direction of travel), while in '591 it pivots about an axis that is nearly vertical. While the Baugher '130, '995, and '591 patents retain most of the other functional elements of the Deere 50-, 60-, and 90-series opener, the seed boots and tubes depicted therein involve substantial revision of the opener design to accommodate the boot and tube; i.e., the boots and tubes depicted in these patents wouldn't fit existing Deere 50-, 60-, and 90-series openers, nor would any alterations allow the boots and tubes to fit those openers without a wholesale rebuilding of the opener subframe. The Baugher '130, '995, and '591 patents also depict a seed tube which is still oriented somewhat rearward and not forward at its lower end, and also with the lower end of the tube located more rearward of the disc's axis than is desirable since the disc is useful in holding the soil and duff out of the furrow while seeds are being placed, and this occurs to the greatest extent where the disc is at the bottom of the furrow (i.e., directly below the disc axis). Furthermore, the Baugher '130, '995, and '591 patents depict seed boots without adequate enclosure of their lower rearward portions to prevent seeds from bouncing into undesirable locations, i.e., seeds not being adequately channeled into the bottom of the furrow. The prior art before Baugher also deployed seed and fertilizer boots (a.k.a. runners or shoes) with nearly identical shapes and construction, i.e, sufficiently narrow as to stay within the furrow cut by the disc. For example, such boots were used in single-disc gauge-wheel fertilizer openers sold by John Deere since the late 1980s on their row-crop planters.

Yet another type of seed boot for single-disc drill openers is described in Wendling et al., U.S. Pat. No. 6,347,594 B1, with a substantially vertical seed tube passing rearward of the opener disc's hub. The seed tube is attached directly to a narrow boot that pivots about a bolt on a horizontal axis (along the direction of travel, and parallel to the opener disc). The boot and tube are biased toward the opener disc via a leaf spring. However, the boot and tube design and attachment method constitute a major departure from the Deere 60- and 90-series openers; thus, this boot and tube arrangement envisioned by Wendling in the '594 patent could not be fitted onto those openers without a wholesale rebuilding of the opener subframe. The opener depicted in the '594 patent has trailing wheels and arms for covering or packing that are dramatically different from the Deere 50-, 60-, and 90-series' firming and closing arms, with considerably more space afforded for the boot and tube assembly described and depicted in the '594 patent. And, again, the rearward lower portion of the boot in Wendling '594 fails to create sufficient enclosure to direct the great majority of seeds into the bottom of the furrow.

SUMMARY OF THE INVENTION

After extensive field testing, the Applicant developed a seed boot and tube configuration for the John Deere 60- and 90-series opener assemblies that allows the tube to be oriented much more vertically (to the extent of angled forward at the bottom end) with the tube passing behind the opener disc's hub, and with a seed boot that stays entirely in the shadow of the opener disc (entirely within the furrow cut), thereby allowing the boot to extend considerably below the soil surface without imposing additional draft or down-force requirement on the drill or openers. Because the boot remains within the shadow of the opener disc, the wear on the boot and its attachment point (including the leaf spring) are substantially reduced as compared to the OEM design.

Because the Deere 60- and 90-series design had a trajectory of seed delivery that was rearward at 45 degrees from vertical, and because the boot did not extend into the furrow, the wear occurring around the attachment bolt allowed the boot to tip even more horizontally when dragging in the soil, thereby causing still more seeds to be directed out of the furrow. Wear at the attachment bolt is far less critical for Applicant's boot, because the seed delivery tube is oriented slightly forward instead of rearward, because the tube is independent of the boot, and because the Applicant's boot extends significantly below the soil surface during normal operation. These attributes of the Applicant's invention ensure a high percentage of properly placed seeds regardless of wear at the boot's attaching bolt.

Field testing has also shown the Applicant's boot to have significantly fewer problems with mud blockages as compared to the OEM design, presumably due to greater clearances in areas that typically gather mud from the opener disc, as well as the boot's narrower profile (i.e., remaining entirely in the shadow of the opener disc). The more vertical orientation of Applicant's seed delivery tube has further advantages in the reduced likelihood of seed or fertilizers failing to flow, as well as a more direct path with fewer obstructions to permit high product delivery rates, to allow large seeds to pass easily, and to facilitate clean-out should an obstruction (e.g., a fertilizer clump) occur.

Applicant's boot is attached directly to the opener subframe and is completely independent of the tube, which allows for easier installation and adjustment as well as reducing the stress imposed on the seed tube and its mounting points. The boot is attached via a single bolt with limited degrees of rotatable movement allowed about the axis of that bolt. The limited rotatable movement of the boot allows the boot to self-align against the opener disc. The boot is biased toward the opener disc by a leaf spring (the leaf spring and bolt are original equipment from the Deere 60- and 90-series opener assemblies).

Because the boot is completely independent of the tube and not in any way constrained in its movement towards the opener disc during its normal wear life, no issue is presented with the boot failing to return to its proper operating position if deflected, such as by the Deere 60- and 90-series opener's firming wheel coming to rest on the boot when the opener assembly is lifted clear of the soil, or during maintenance or field operation. The seed tube is installed easily onto the opener subframe using existing features and without weakening the subframe with cutting or drilling additional holes or doing any welding. The seed tube can be easily removed for servicing the other components of the opener assembly.

A seed-bounce flap at the rear of the boot ensures that seeds do not follow the rear edge of the opener disc upward during its rotation, as well as further directing the seeds into the bottom of the furrow. The flap is oriented essentially vertically, and completely covers the rear aperture of the chamber that is created by the opener disc and the boot so that an extremely high percentage of seeds is funneled into the bottom of the furrow, i.e., gaps at the rear of the boot are essentially eliminated.

Applicant's seed boot is formed of sheet metal or similar material, and may be formed of abrasion-resistant high-carbon steel (e.g., AR 400 plate) or hard-surfaced on its lower edge to inhibit wear by the soil when seeding on contours, or when seeding on slopes sufficient to cause the opener discs to slightly mistrack such that the boot's lower edge abrades significantly against the furrow sidewall. In one variation of Applicant's invention, the OEM firming wheel arm is replaced with one that is functionally 1.5 inches longer and with a protrusion such that when the opener assembly is raised the firming wheel arm strikes the upper rearward corner of the boot, preventing the firming wheel itself from contacting the rear of the boot, which has numerous advantages.

Numerous other objects and advantages of the present invention will be apparent to those skilled in this art from the following description wherein there is shown and described an embodiment of the present invention, simply by way of illustration of one of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the invention is made with reference to the accompanying drawings.

FIG. 1 is a cross-sectional view of the furrow and prior art seed boot, as viewed from the soil surface looking along the direction of travel of the opener assembly when the opener assembly is viewed from behind.

FIG. 2 is a cross-sectional view of the furrow and a seed boot and tube according to the present invention, as viewed from the soil surface looking along the direction of travel of the opener assembly when viewed from behind.

FIG. 3 is an exploded-perspective view of the drill opener assembly and prior art seed boot, as viewed from an elevated perspective slightly towards the rear and from beyond the right-hand side of the opener assembly itself.

FIG. 4 is an exploded-perspective view of the drill opener unit together with a seed boot and tube according to the present invention, as viewed from an elevated perspective to the rear and from beyond the right-hand side of the opener assembly.

DETAILED DESCRIPTION OF THE INVENTION

An improved seed directing tube and boot for agricultural seeders according to preferred embodiments of the present invention will now be described in detail by reference to FIGS. 1 to 8 of the accompanying drawings.

Figure 1:
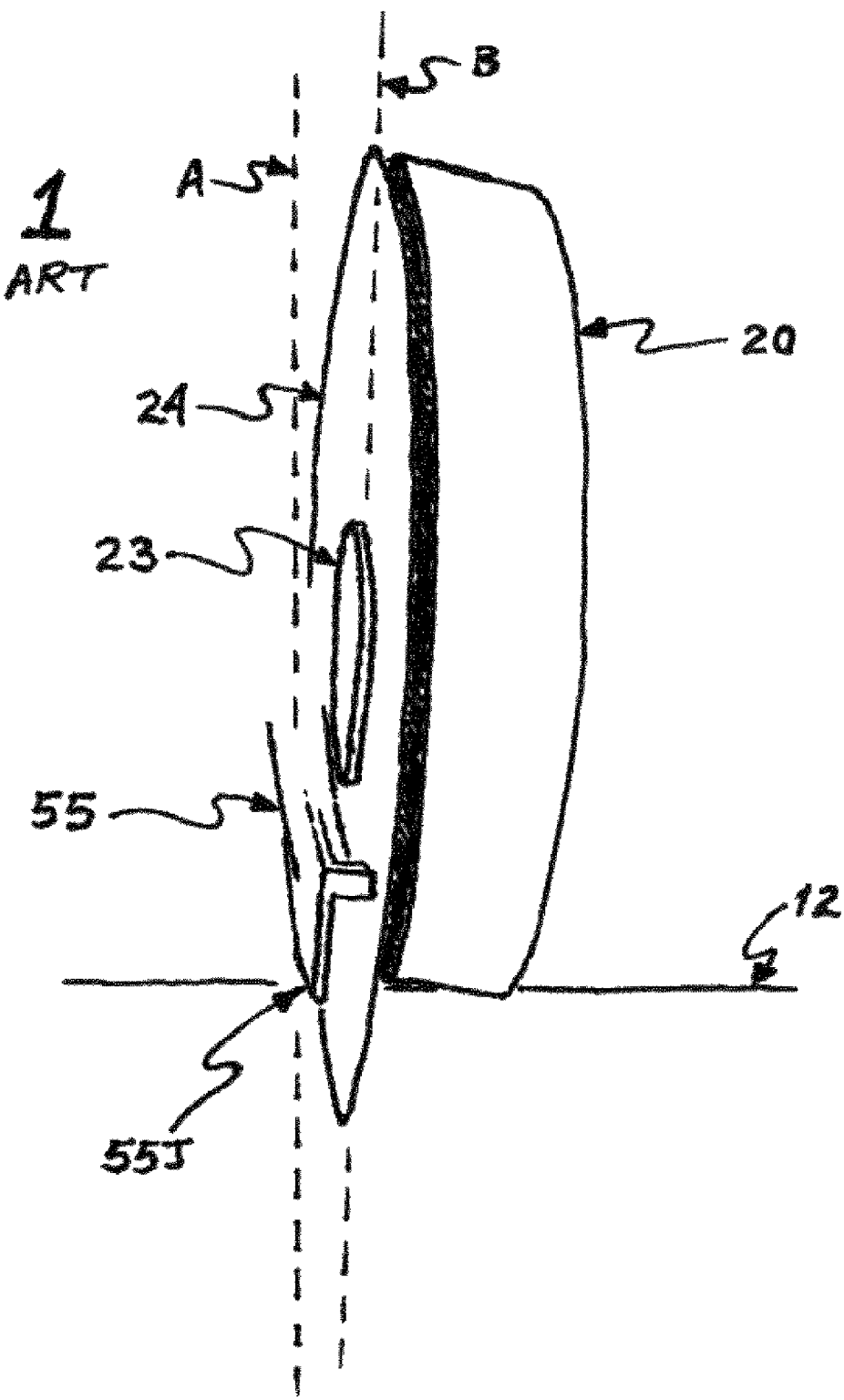
In FIGS. 1 to 4 as well as FIGS. 6 to 8, the opener assemblies are depicted as right-handed opener assemblies, although both right-hand and left-hand versions are available which are mirror images of each other. In the drawings.

FIG. 1 is a cross-sectional view of the furrow-forming and seed-directing components of a common no-till drill opener assembly, the Deere 60 & 90-series. The view depicted is from the soil surface looking along the direction of travel of the opener assembly when viewed from behind, taking into account the slight angle of the blade to the direction of travel. A plurality of opener assemblies are attached to a rockshaft (not shown) which is itself attached to a toolbar (not shown) for purposes of field operation in which the opener assemblies are drawn along the soil for placing seeds therein. While being pulled forward, pressure (down-force) is applied to the opener assembly via a large coil spring (not shown), which causes the opener disc 24 to rotate on its hub 23 about an axis and to penetrate the soil 12 with the penetration being limited by either the gauge wheel 20 or the amount of down-force available. The opener subframe (shown in FIG. 3) causes the opener disc 24 to operate at a slight angle to the direction of travel, which causes soil 12 at the rearward edge of the opener disc 24 to move towards the gauge-wheel 20 side of the opener disc 24 thus creating an open furrow. The opener subframe also causes the opener disc 24 to operate at a slight departure from dimension 'A,' with dimension 'A' being defined as perpendicular to the soil 12 and nearby terrain. If the soil 12 and nearby terrain are exactly horizontal, then dimension 'A' is exactly vertical ("nearby terrain" is important because the toolbar's orientation is determined by the interaction of the toolbar's transport wheels against the topography being covered by the drill). The opener disc 24 operates in dimension 'B,' which is a slight departure from dimension 'A' so that the upper edge of the opener disc 24 is tilted towards the gauge-wheel 20 side of the opener assembly.

FIG. 1 is looking along the soil surface and along the path of the opener disc 24, which is traveling away from the viewer. The prior art seed boot 55 is relatively wide and has a lower edge 55J that protrudes significantly beyond the cut of the opener disc 24. Because of the resistance of the soil 12, especially in no-till conditions, it is quite difficult to operate the lower edge 55J much below the soil surface.

Figure 2:
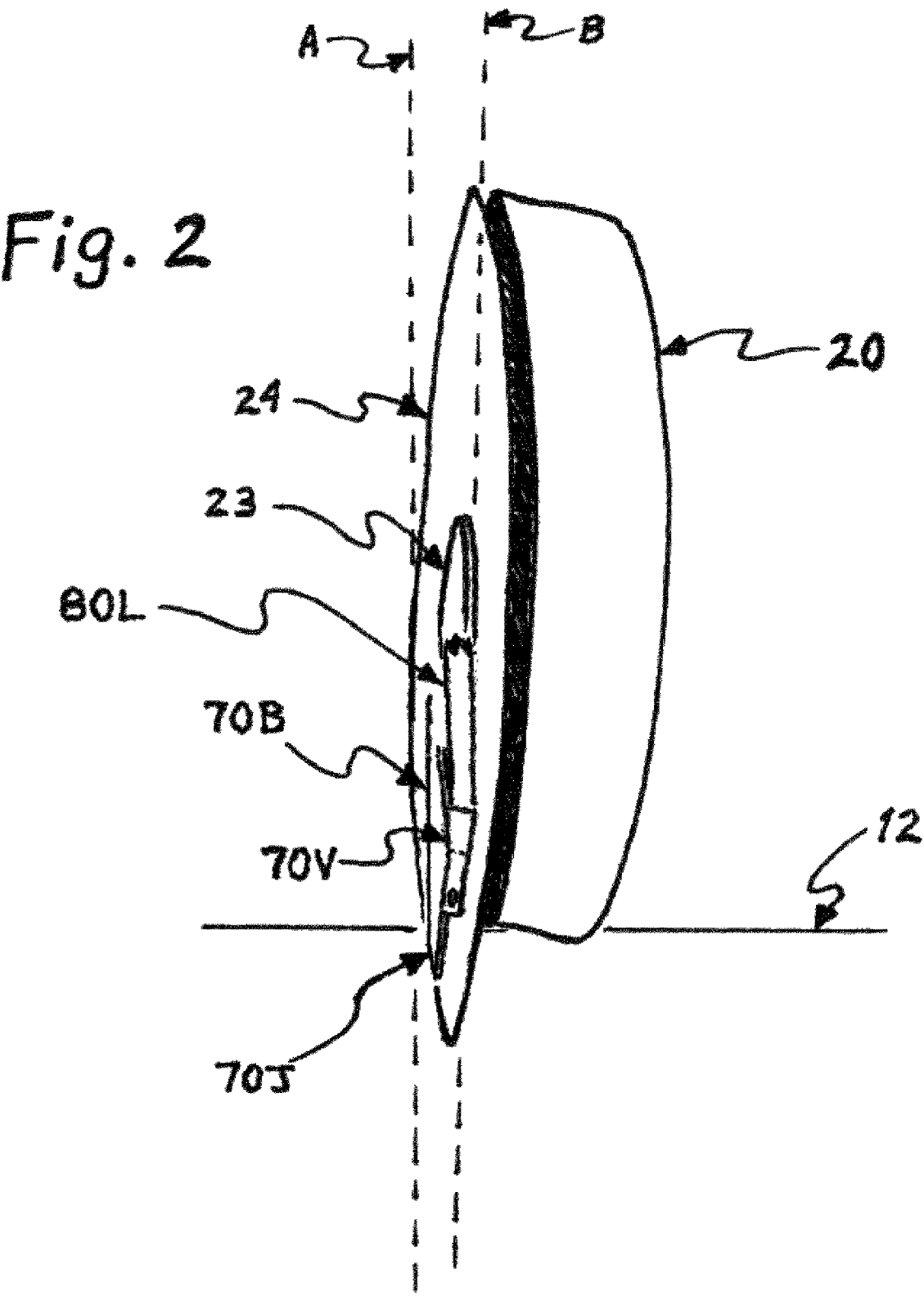

FIG. 2 is the same view as in FIG. 1, except that a seed boot 70 and seed tube's lower portion 80L according to the present invention are depicted (dimensions 'A' and 'B,' the soil 12, and the opener components 20, 23, and 24 are the same as in FIG. 1). The seed boot 70 is arranged to hold and prevent loose soil adjacent to and/or comprising the side of the furrow from falling into the furrow in advance of the seed (not shown) being deposited in the furrow. The seed boot 70 has a first portion for attaching the boot 70 to the opener subframe 26 at a location above and forward of the hub 23 of the opener disc 24. A second portion of the seed boot 70 comprises a forward edge 70B that fits snugly against the opener disc 24 and functions as a scraper edge for contacting and scraping the side of the opener disc 24.

A third portion of the seed boot 70 forms an enclosure between the boot 70 and the opener disc 24 for guiding seeds into position in the furrow created by the opener disc 24. The third portion includes a primary wall 70A spaced apart laterally from the opener disc 24, and a rear wall comprising an end-cap 70V that extends between the primary wall 70A and the opener disc 24. The enclosure formed between the boot 70 and the opener disc 24 is below and rearward of the hub 23 of the opener disc 24. The rear wall of the enclosure also comprises a flexible but resilient seed bounce flap 72 (shown in FIGS. 6 to 8) that extends downwardly from the end-cap 70V. A lower edge 70J of the boot 70 stays entirely within the cut furrow created by the opener disc 24 in the soil 12. The upper-rearward portion 70P and the end-cap 70V of the third portion of the seed boot 70 are flared to accommodate the seed tube's lower end 80L without excessively constricting the width of the tube's lower end 80L.

Figure 3:
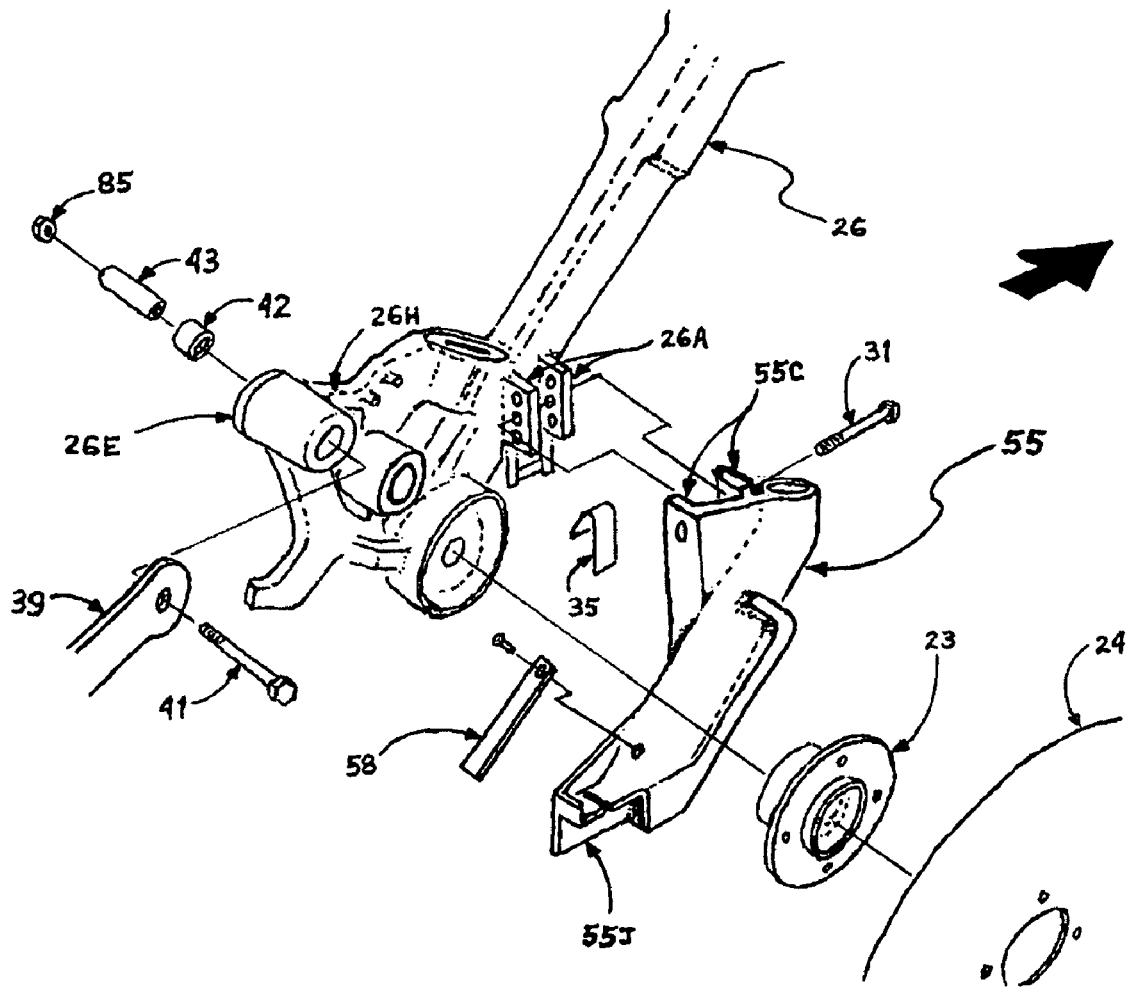

FIG. 3 is an exploded view from a side-elevational perspective of the prior art seed boot 55 and the opener subframe 26 to which it attaches. The boot 55 is held from its upper end by a single bolt 31 extending in a longitudinal direction relative to a direction of travel of the opener assembly. The bolt 31 passes through holes in the boot's ears 55C, which overlap the subframe ears 26A. The bolt 31 is secured by a locknut (not shown) threaded onto the bolt 31. A leaf spring 35 is contained by the ears 26A, the bolt 31, and by ridges (not shown) along one side of the boot 55 and on the subframe 26 (immediately below the ears 26A in both cases). The boot 55 can rotate a few degrees on the axis of the bolt 31, with the one side of the boot 55 being biased against the opener disc 24 by the force exerted by the leaf spring 35. At the rear of the boot 55, a seed bounce flap 58 can be slid into a groove and secured by a screw (depicted but not labeled), with the flap 58 protruding downward and rearward at about a 45-degree angle to the direction of travel (indicated by the wide arrow on the right-hand side of the FIG. 3). Other components labeled in FIG. 3 are for reference only, and will be described in detail in the discussion of FIG. 4.

Figure 4:
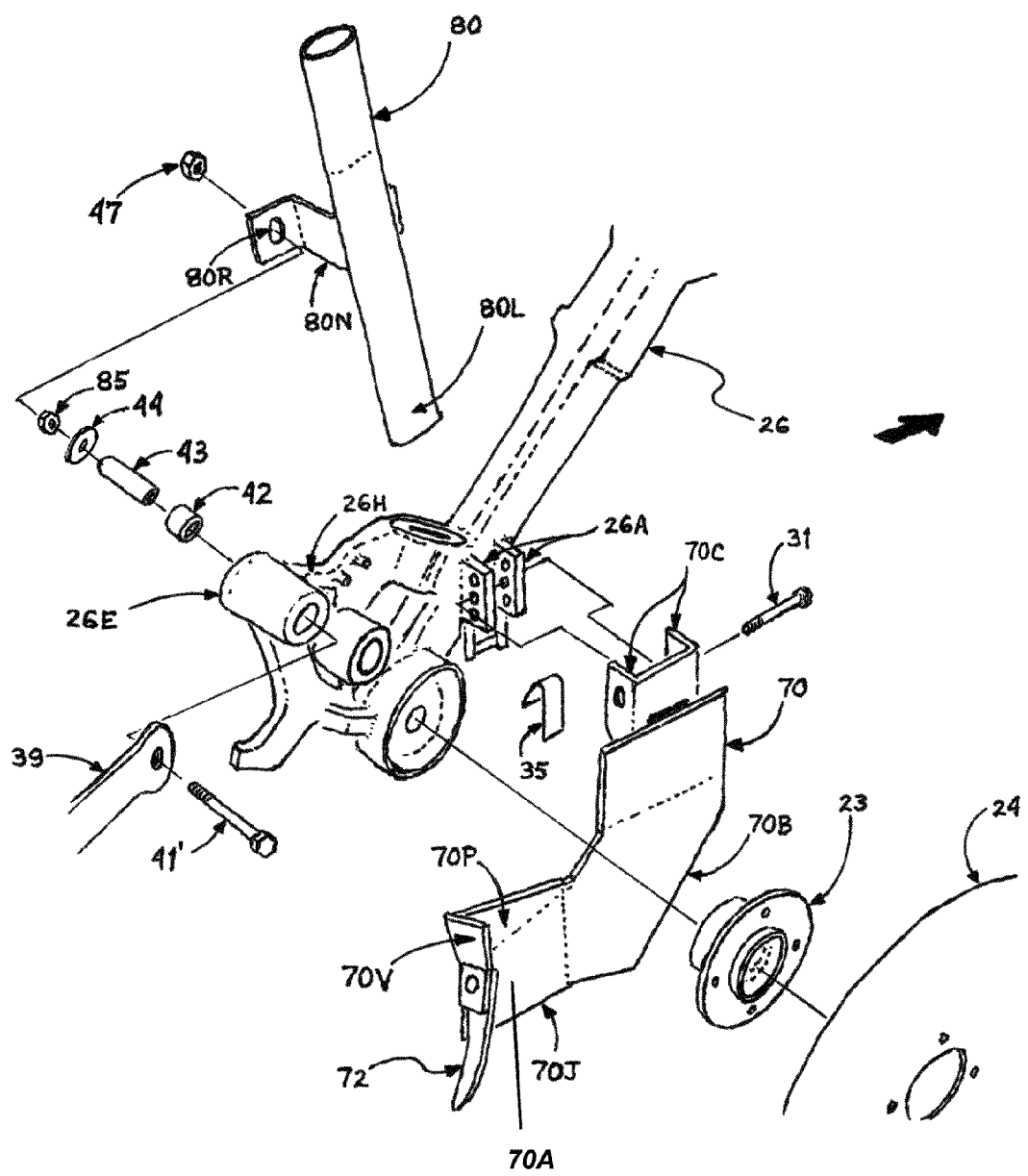

FIG. 4 is an exploded view from a side-elevational perspective of the present invention and the opener subframe 26 to which it attaches. The boot 70 is held from its upper forward end by a single bolt 31 passing through the holes in the boot's ears 70C which overlap the subframe ears 26A, and secured by a locknut (not shown) threaded onto the bolt 31. A leaf spring 35 is contained by the ears 26A, the bolt 31, and by ridges (not shown) along one side of the boot 70 and on the subframe 26 (immediately below the ears 26A in both cases). The boot 70 can rotate a few degrees on the axis of the bolt 31, with the boot's forward edge 70B being held against the opener disc 24 from the force exerted by the leaf spring 35.

The rearward portion of the boot 70 culminates in the end-cap 70V, which extends from the primary wall 70A towards the opener disc 24 to create the enclosure for receiving the lower end of the seed tube 80 and for guiding seeds into position in the furrow upon exiting the lower end 80L of the seed tube. The boot's end-cap 70V includes a hole for attaching the seed bounce flap 72 via a bolt 73 (FIG. 7) such that the flap 72 is oriented essentially vertically but allowed to bend rearward at its lower edge during field operation.

The flap 72 is essentially perpendicular to the plane of the opener disc 24 with one lateral edge of the flap 72 abutting the opener disc 24, while the boot's metal end-cap 70V has an edge that terminates just prior to contacting the opener disc. The boot's upper-rearward portion 70P as well as end-cap 70V are flared away from the opener disc 24 to accommodate the tube's lower end 80L. The lower end 80L is elliptical in cross-section, with a smaller dimension in a lateral direction than in a longitudinal direction, to occupy less lateral space in passing the constrictions among the opener components such as the firming wheel pivot bolt (not shown), as well as requiring less flaring of the boot portion 70P and the end-cap 70V.

The lower end 80L of the seed tube 80 extends into the enclosure created by the seed boot 70. An upper end of the seed tube 80 is positioned to receive seeds from a metering mechanism (not shown) attached to the seed supply tank (not shown). The seed tube 80 is secured by an S-shaped bracket 80N extending laterally and rearwardly from the tube 80, with a hole 80R in the inner rearward portion of the bracket 80N. The bracket 80N is secured by passing a bolt 41' through the hole 80R. The bolt 41' is slightly longer than the OEM bolt 41, both of which are employed to pivotally mount the closing wheel arm 39 to a socket 26E formed in the casting of the opener subframe 26. The seed tube 80 is thus attached to the opener subframe 26 independently of the boot 70 so that the boot 70 can move independently with respect to the seed tube 80.

Because of the relatively rigid nature of the tube 80 and the bracket 80N in relation to opener subframe 26, and the reasonably tight fit of the hole 80R onto a sleeve area machined into the nut 47 (see FIG. 5 for clear depiction), the tube's lower end 80L is stabilized in position so as generally not to laterally contact either the opener disc 24 or the flared upper portion 70P of the boot 70. Alternatively, the hole 80R may be constructed so as to be sufficiently loose that boot 70 merely deflects the tube's lower end 80L towards the blade, since minor wear on this side of the tube's lower end 80L is not detrimental to performance. The tube 80 is prevented from rotating rearward at its lower end 80L by a portion of the bracket 80N coming into contact with the area 26H of the subframe 26.

Once the tube 80 is installed, the lower end 80L of the tube 80 can rotate forward only about 0.5 to 0.75-inch before contacting the hub 23. The tube 80 can be secured away from the hub 23 with a specially formed clasp (not shown) of spring steel, or similar means. Alternatively, the tube 80 may be allowed to rotate forward until contacting the hub 23, being allowed to rub against the hub 23 via a special wear pad (not shown) attached to the tube 80 in the appropriate location. Other components labeled in FIG. 4 are for reference only, and will be described in detail in the discussion of FIG. 5.

Figure 5:
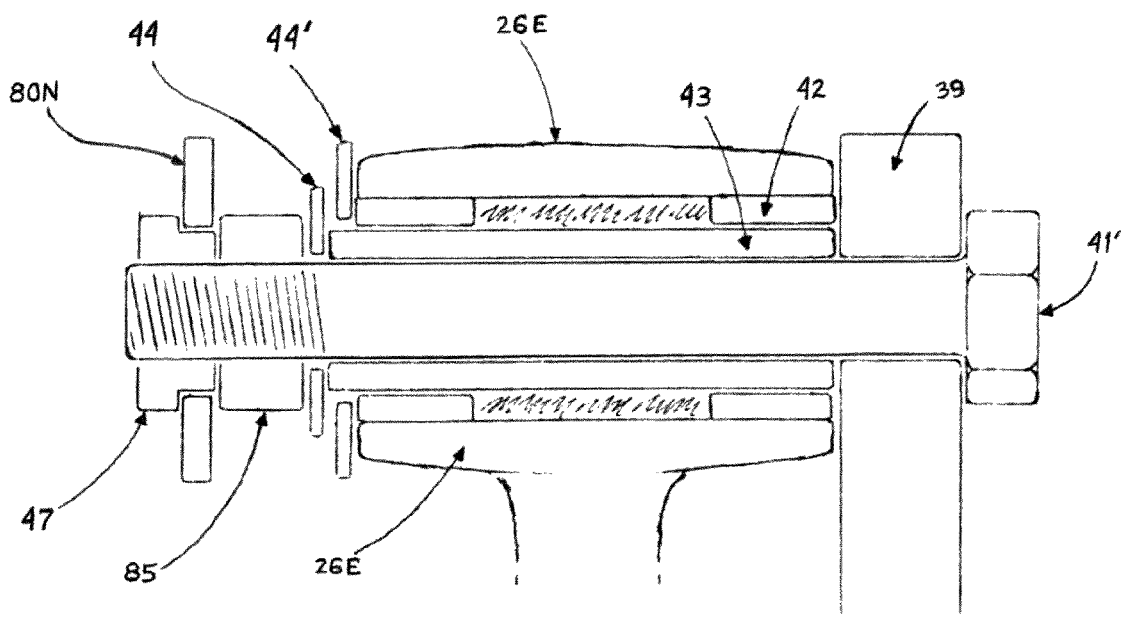
FIG. 5 is a cross-sectional view of the attachment point of the seed tube according to the present invention.

FIG. 5 is a cross-sectional view of the closing arm assembly for the Deere 60 & 90-series drill opener assembly. The closing arm 39 is pivotally connected to the opener subframe 26 by the bolt 41', which (in conjunction with the sleeve 43) provides a pivot structure for allowing the closing arm 39 to rotatably move independently of the subframe 26. The bolt 41' also serves as the attachment point for the bracket 80N of the seed tube 80. The bolt 41' extends through the housing 26E of the opener subframe 26 and has the closing arm 39 attached on one side of the housing 26E of the subframe 26, and the bracket 80N attached on the other side of the housing 26E. The original bolt 41 (see FIG. 3) that passes through the closing arm 39 and the tubular sleeve 43 has been replaced with a bolt 41' that is approximately 0.5 inch longer.

The sleeve 43 fits inside a pair of sleeves 42 that have been pressed into the cast housing 26E, with sufficient clearance that the periphery of the sleeve 43 can rotatably move inside the sleeves 42, with this rotatable movement further accommodated by the sleeve 43 being slightly longer than the axial length of the bore in housing 26E. Washer 44 contains or "sandwiches" the sleeve 43 against the arm 39 as the locknut 85 is threaded and tightened. A special locknut 47 has been fabricated to include a reduced-diameter bushing area along part of its length. The seed tube bracket 80N is then installed with the hole 80R over the bolt 41', and the special locknut 47 is threaded into place with the reduced-diameter bushing area fitting inside the hole 80R. The tube 80 is trapped or contained when the special locknut 47 is tightened, although the clearance between the hole 80R and the bushing area of the special locknut 47 permits the tube 80 to be isolated from the rotational movement of the bolt 41' and closing arm 39 during field operation. The closing wheel (not shown) will follow undulations in the topography and cause back-and-forth rotation of the bolt 41' as the arm 39 moves up and down, without causing the seed tube 80 to move.

Figure 6:
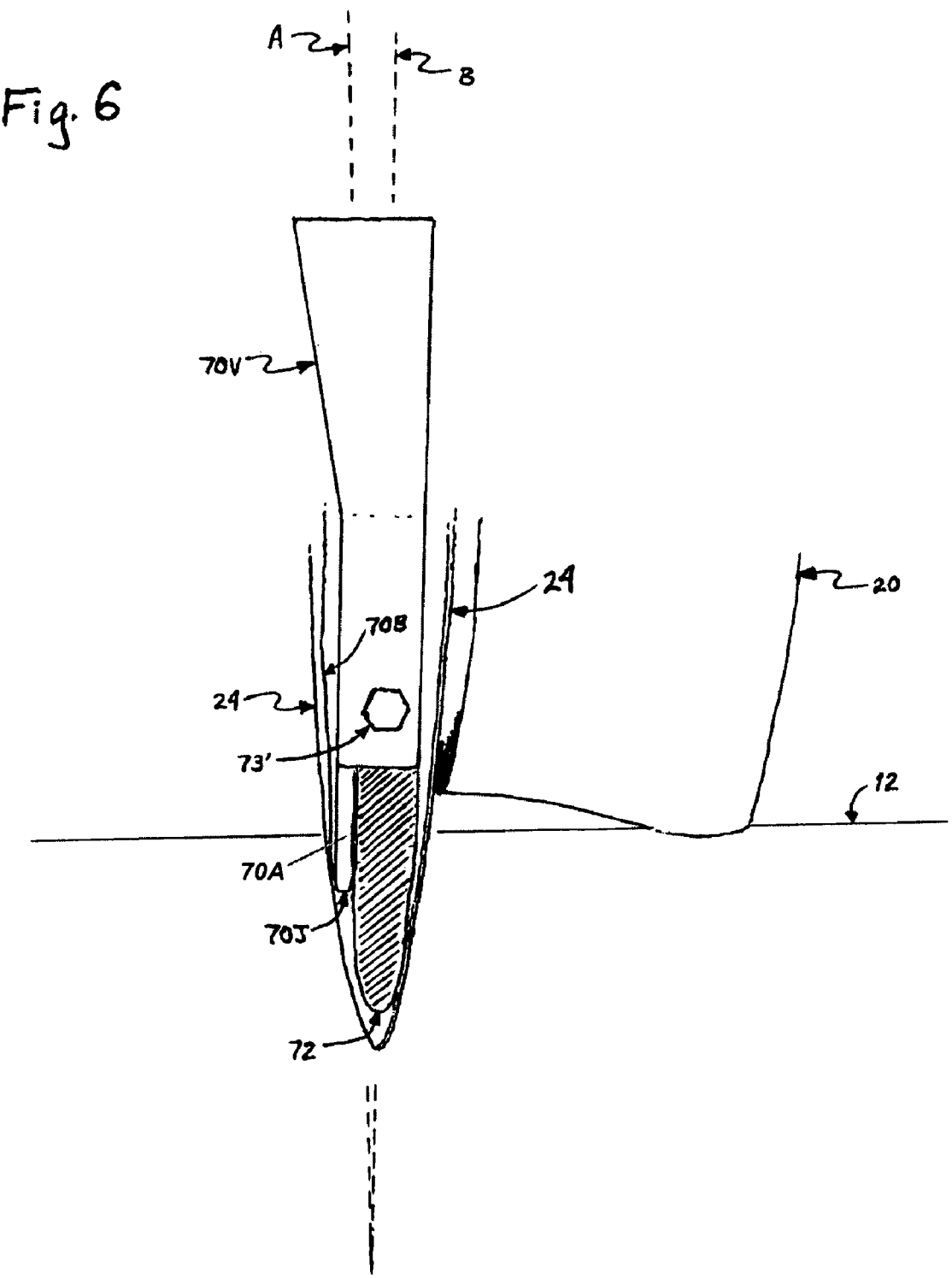
FIG. 6 is a cross-sectional view of the furrow and a seed boot and tube according to the present invention, as viewed from the soil surface looking along the direction of travel of the opener assembly when viewed from behind; it is the same view as FIG. 2 but enlarged.

FIG. 6 is an enlarged view of FIG. 2 from the same perspective and with all parts and labels identical to FIG. 2, except that the seed bounce flap 72 is depicted (hashed lines), which would typically be flexing towards the direction of the viewer due to drag exerted on the lower end of the flap 72 by the soil comprising the bottom of the furrow. One lateral edge of the flap 72 fits flush against the planar side of the opener disc 24, while the other lateral edge of the flap 72 fits closely against the primary wall 70A of the boot 70, thereby creating a chamber or enclosure for funneling seeds through the enclosure and into the bottom of the furrow. The flap 72 operates in approximately the same plane as the boot's end-cap 70V. The flap 72 is attached to the boot's end-cap 70V by means of a bolt 73' or similar fastener. The flap 72 can be made of nylon, polyethylene, UHMW plastic, or similar material that has flexing capability but some resilience of shape such that it can bend to clear obstacles but then return to its previous location to guide seeds (not shown) into position and to prevent seeds from following the opener disc 24 as it rotates upward.

Figure 7:
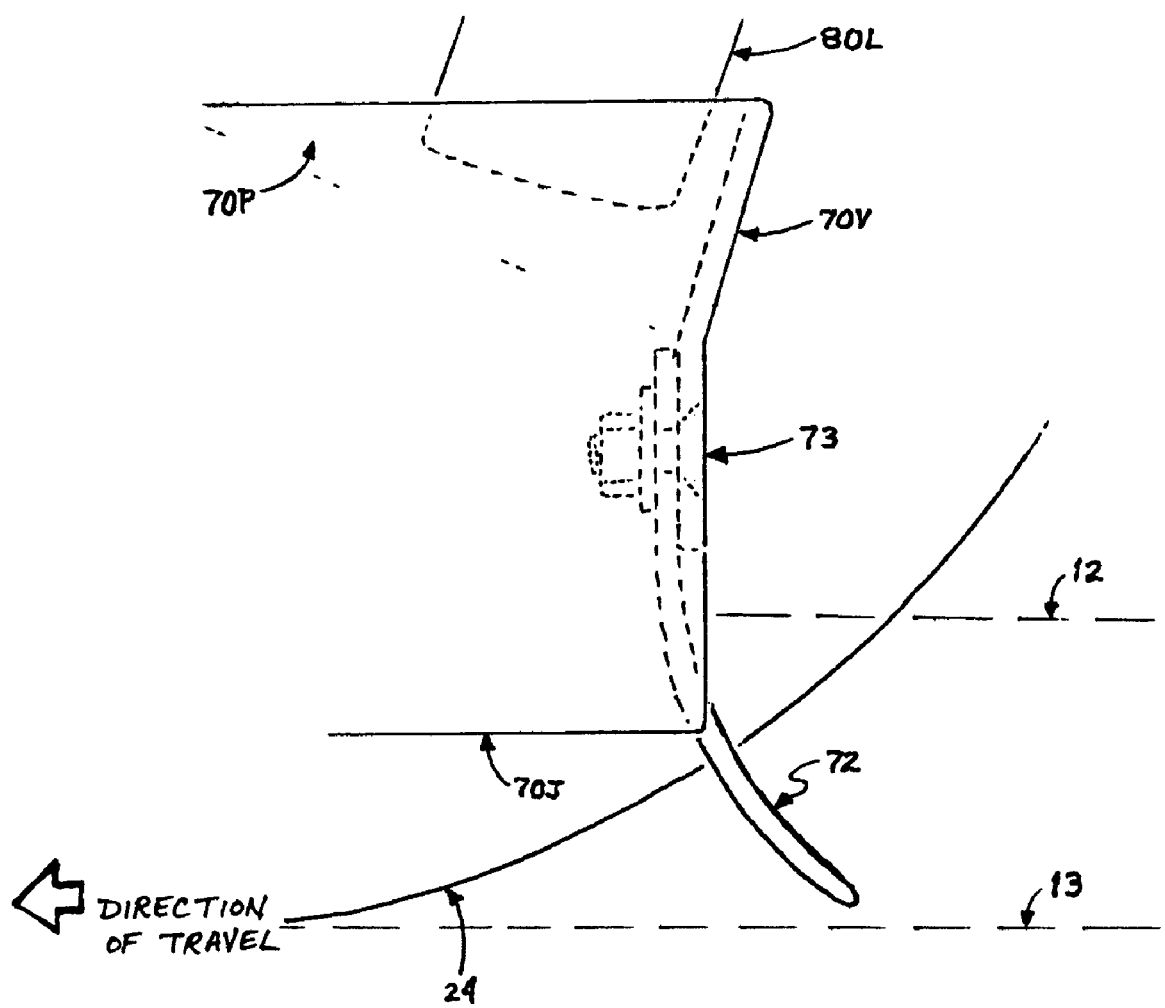
FIG. 7 is a cross-sectional view of the furrow and a seed boot and tube according to the present invention, as viewed from the soil surface looking perpendicular to the direction of travel of the opener assembly.

FIG. 7 is a cross-sectional side-view of the invention. The flap 72 is secured to the boot's end-cap 70V by means of a counter-sunk bolt 73. The furrow bottom 13 is the depth cut by the opener disc 24, upon which the lower end of the flap 72 may drag, thereby causing minor arching of the flap 72. It is considered desirable that the flap 72 extend as close to the furrow bottom 13 as feasible, and that the flap 72 has its lateral lower edges narrowing (tapering) to match the shape of the furrow being cut by the opener disc 24 as depicted in FIG. 6.

Figure 8:
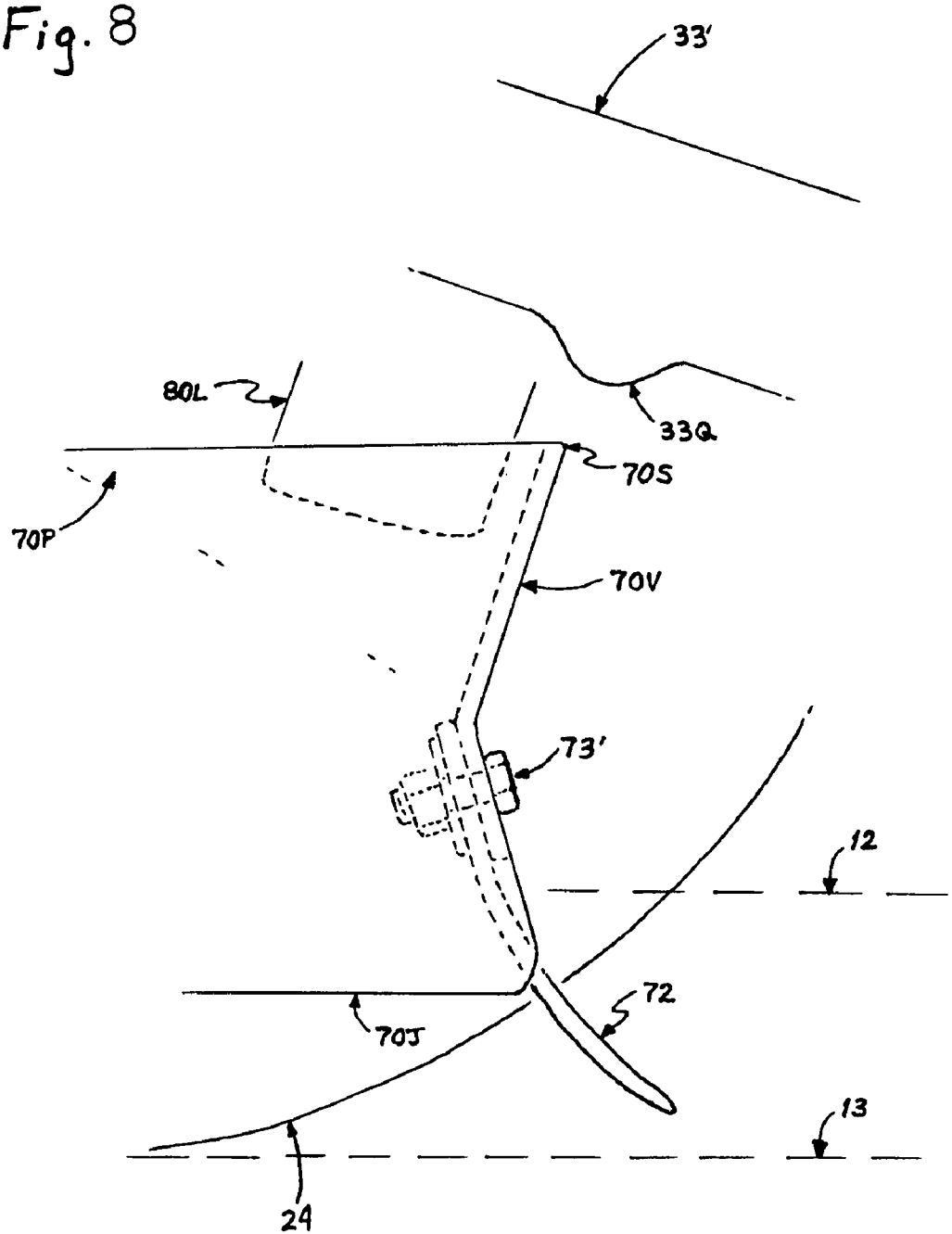
FIG. 8 is a cross-sectional view of the furrow and a seed boot and tube according to a variation of the present invention, as viewed from the soil surface looking perpendicular to the direction of travel of the opener assembly.

FIG. 8 is from the same perspective as FIG. 7, but with FIG. 8 depicting a variation of the invention whereby the shape of the boot 70 and the end-cap 70V are altered such that the flap 72 is now attached to an area that is inclined slightly from vertical. This variation reduces the arching of the flap 72 as depicted in FIG. 7, thereby reducing stress on the flap 72 and reducing breakage of the flap 72 during field operation. The angle depicted in FIG. 8 also provides better ability of the flap 72 to shed mud or other debris that occasionally is encountered by the flap 72.

Also shown in FIG. 8 is another aspect of the invention wherein firming wheel arm 33' replaces the original firming wheel arm (not shown). The firming wheel arm 33' differs from the original firming arm in being approximately 1.5 inches longer, and having a protrusion 33Q. When drill openers are raised for transport or turning in the field, previously the original firming wheel arm (not shown) was stopped in its downward travel when the firming wheel (not shown) came to rest on the rear portion of the original boot 55. Occasionally this would cause damage to the boot 55, as well as wearing both the boot 55 and the firming wheel (not shown) due to the sudden and repeated arresting of the firming wheel's rotation.

The protrusion 33Q of the replacement firming arm 33' functions as an abutment for abutting a rear portion of the boot 70 to limit downward movement of the firming arm 33'. The geometry of the protrusion 33Q is such that contact is made with an upper rearward boot corner 70S of the boot 70 to halt downward motion of the firming arm 33'. Thus, the downward motion of the firming arm 33' is halted prior to the firming wheel contacting the seed boot 70 at the lower part of the end-cap 70V. This prevents damage to the firming wheel and the end-cap 70V, and eliminates the need for a smooth surface on the rearward edge of the boot end-cap 70V to minimize such damage. This allows the bolt 73' to have a typical hexagonal head without the need to be countersunk. The added length of the firming arm 33' also improves clearance between the firming wheel (not shown) and the rearward edge of boot 70, which improves the ability of the firming arm 33' and firming wheel to follow soil undulations.

While the invention has been specifically described in connection with specific embodiments thereof, it is to be understood that this is by way of illustration and not of limitation, and the scope of the appended claims should be construed as broadly as the prior art will permit.

What is claimed is:

1. A opener assembly for an agricultural seeder, comprising:
    an opener subframe;
    an opener disc attached to said opener subframe for rotation about an axis, said opener disc being arranged for forming a furrow in the ground;
    a boot having a first portion for attaching the boot to said opener subframe, a second portion for contacting and scraping said opener disc, and a third portion for creating an enclosure between said boot and said opener disc rearward of and below said axis;
    a seed tube having a lower end extending into said enclosure; and
    a bracket extending between said seed tube and said opener subframe for securing said seed tube to said opener subframe independent of said boot, with said seed tube disposed rearward of said axis, said boot being moveable independently with respect to said seed tube.

2. The opener assembly according to claim 1, wherein said seed tube has an upper end and a lower end, and said upper end is positioned rearward of said lower end so that the seed tube extends downwardly and forwardly from said upper end to said lower end behind said axis of said opener disc.

3. The opener assembly according to claim 1, further comprising a closing arm pivotally connected to said opener subframe by a pivot structure, said closing arm being separate from said boot and moveable independently of said boot and said seed tube, and wherein said bracket is connected to said opener subframe through said pivot structure.

4. The opener assembly according to claim 3, wherein said pivot structure extends through a housing of said opener subframe, and wherein said closing arm and said bracket are attached to said pivot structure on opposite sides of said housing.

5. The opener assembly according to claim 3, wherein said bracket is attached to said pivot structure in a manner that allows the pivot structure to rotate relative to said opener subframe while the seed tube remains stationary relative to said opener subframe.

6. The opener assembly according to claim 3, wherein said pivot structure comprises a threaded bolt that extends through a bushing in the opener subframe, and wherein said bracket is attached to said bolt by a structure that allows relative pivotal movement between said closing arm and said bracket to isolate the bracket from movement of said closing arm.

7. The opener assembly according to claim 1, wherein said first portion for attaching the boot to said opener subframe comprises a first pair of ears that overlap a second pair of ears on the opener subframe, and wherein said boot is connected to said opener subframe by a bolt extending through said first and second pairs of ears.

8. The opener assembly according to claim 7, wherein said bolt extends through said ears in a generally longitudinal direction relative to a direction of travel of said opener assembly, and wherein said boot is pivoted around an axis of said bolt to allow the second portion of the boot to be biased against the opener disc.

9. The opener assembly according to claim 8, further comprising a leaf spring arranged between said opener subframe and said boot to bias said boot toward said opener disc.

10. The opener assembly according to claim 1, wherein said third portion of said boot comprises upper-rearward portions that are flared outwardly away from the opener disc to accommodate the lower end of the seed tube.

11. The opener assembly according to claim 1, wherein the lower end of said seed tube has a cross-section that defines an elliptical shape having a smaller dimension in a lateral direction than in a longitudinal direction.

12. The opener assembly according to claim 1, wherein the bracket is generally S-shaped with first and second ends, and wherein said first end of the bracket is attached to the seed tube, and said second end has an opening formed therein for securing the bracket to the opener subframe.

13. The opener assembly according to claim 1, wherein said bracket has a first end secured to said seed tube, a second end having an opening formed therein for attaching to a pivot structure extending from the opener subframe, and a portion of the bracket between said first and second ends being arranged to engage said opener subframe to stabilize the seed tube.

14. The opener assembly according to claim 1, wherein said seed tube has an upper end and a lower end, and said upper end is positioned rearward of said lower end so that the seed tube extends downwardly and forwardly from said upper end to said lower end behind said axis of said opener disc.

15. The opener assembly according to claim 1, wherein said opener disc is arranged to operate at an angle to the direction of travel to create said furrow in the ground, and wherein a lower edge of said boot fits entirely within said furrow created by the opener disc.

16. The opener assembly according to claim 15, further comprising a gauge wheel arranged to operate on a side of said opener disc opposite from said boot with said opener disc positioned between said boot and said gauge wheel.

17. The opener assembly according to claim 16, wherein said opener disc has an upper edge tilted towards the gauge wheel.

18. The opener assembly according to claim 1, wherein said first portion of the boot attaches the boot to the opener subframe at a location above and forward of said axis of the opener disc, said second portion of the boot extends forward of and below said axis, and said third portion of the boot extends rearward of and below said axis.

19. The opener assembly according to claim 1, further comprising a closing arm pivotally connected to said opener subframe by a pivot structure that allows said closing arm to pivot about a horizontal axis perpendicular to a direction of travel, said closing arm being separate from said boot and moveable independently of said boot and said seed tube, and wherein said bracket is connected to said opener subframe through said pivot structure.

20. An opener assembly for an agricultural seeder, comprising:
    an opener subframe;
    an opener disc attached to said opener subframe for rotation about an axis, said opener disc being arranged to operate at an angle to the direction of travel to create a furrow for depositing seeds;
    a boot for preventing loose soil adjacent the side of the furrow from falling into the furrow in advance of seed deposited therein, said boot having a first portion for attaching the boot to said opener subframe, a second portion for contacting and scraping said opener disc, and a third portion for creating an enclosure between said boot and said opener disc rearward of and below said axis, said third portion having a lower edge that fits entirely within the furrow created by the opener disc;

a seed tube having a lower end extending into said enclosure; and a bracket extending between said seed tube and said opener subframe for securing said seed tube to said opener subframe independently of said boot with the seed tube extending behind said axis of said opener disc, said boot being moveable independently with respect to said seed tube.

21. The opener assembly according to claim 20, wherein said seed tube extends downwardly and forwardly behind said axis of said opener disc.

22. A method of attaching a seed tube and boot to an agricultural seeder, comprising:

attaching a boot to an opener subframe with a leaf spring biasing the boot against an opener disc;

positioning a seed tube behind an axis of the opener disc with a lower end of the seed tube arranged to deposit seeds into an enclosure defined by said boot; and attaching said seed tube to said opener subframe independent of said boot so that said boot is moveable independently with respect to said seed tube.

23. The method according to claim 22, wherein said seed tube is attached to the opener subframe using a seed tube bracket attached to a pivot structure of a closing wheel arm.

* * * * *